United States Patent
Jones

(10) Patent No.: US 12,496,241 B2
(45) Date of Patent: Dec. 16, 2025

(54) ACCESSIBILITY VEHICLE

(71) Applicant: AVAN Mobility Inc., Winnipeg (CA)

(72) Inventor: Bryn Jones, Stonewall (CA)

(73) Assignee: AVAN Mobility Inc., Winnipeg (CA)

( * ) Notice: Subject to any disclaimer, the term of this patent is extended or adjusted under 35 U.S.C. 154(b) by 218 days.

(21) Appl. No.: 18/105,414

(22) Filed: Feb. 3, 2023

(65) Prior Publication Data

US 2023/0301848 A1  Sep. 28, 2023

Related U.S. Application Data

(60) Provisional application No. 63/323,967, filed on Mar. 25, 2022.

(51) Int. Cl.
*A61G 3/06* (2006.01)

(52) U.S. Cl.
CPC ..................... *A61G 3/062* (2013.01)

(58) Field of Classification Search
CPC ..................................................... A61G 3/062
See application file for complete search history.

(56) References Cited

U.S. PATENT DOCUMENTS

| 10,413,459 | B2* | 9/2019 | Teden | A61G 3/062 |
| 2004/0146386 | A1* | 7/2004 | Goodrich | A61G 3/06 |
| | | | | 414/546 |
| 2021/0094395 | A1 | 4/2021 | Hamrick | |
| 2021/0128372 | A1* | 5/2021 | Jones | B60J 5/0477 |

OTHER PUBLICATIONS

"How to Operate a Wheelchair Lift", BraunAbility, https://www.youtube.com/watch?v=vDLdUXcotEc (Year: 2019).*

* cited by examiner

*Primary Examiner* — Kaitlin S Joerger

(57) ABSTRACT

A method comprising modifying a van and installing a wheelchair lift. The wheelchair lift having a horizontal axis and a platform that: has an axis; has a stowed position whereat the platform extends vertically; is pivotable between the stowed position and a raised position whereat the platform extends horizontally; and is movable between the raised position and a lowered position, beneath the raised position. The modification includes: removing a portion of the passenger side between van C and D pillars to create an opening; and mounting double leaf doors adjacent thereto to create an entrance. In the stowed position, the platform is disposed interiorly of the area adjacent the entrance; in the raised position, the platform is disposed exteriorly of the area and communicates with a floor of the area; and, in the lowered position, the platform is disposed exteriorly of the area and communicates with the ground.

16 Claims, 17 Drawing Sheets

ACCESSIBILITY VEHICLE

CROSS-REFERENCE TO RELATED APPLICATIONS

This application claims the benefit of U.S. provisional patent application Ser. No. 62/323,967, filed on Mar. 25, 2022, all of which is incorporated by reference as if completely written herein.

FIELD

The invention relates to the field of accessibility vehicles.

BACKGROUND

It is well known to produce accessibility vehicles, by providing wheelchair lifts in vans, to provide for the transport of persons in wheelchairs. Examples are shown in U.S. Pat. No. 10,413,459 and US 2021/0128372. Conventional vans typically have double leaf doors at the rear, for loading cargo, and a sliding door between the B and C pillar on the passenger side, for human egress. It is commonplace for the lifts to be mounted for wheelchair egress through these existing door assemblies. Accessibility vehicles are often used to convey persons in wheelchairs to locations wherein parallel parking is required. Rear-mounted lifts are disadvantageous in such situations since:

- substantial space needs to be provided behind the vehicle [to open the rear doors, to accommodate the lift on the ground behind the vehicle and to provide for egress of the wheelchair between the lift and the ground]
- the driver's side rear door needs to be swung into a traffic lane
- the wheelchair often needs to be conveyed from sidewalk elevation to road elevation, which, if a poorly positioned sidewalk ramp is to be used, may involve conveyance of the wheelchair around the van on a traffic lane.

Side mounted lifts overcome all of the above problems, but maneuvering a wheelchair into and out of the rear compartment of a van from a lift that utilizes a door between the B and C pillars can be difficult; given the space constraints, the wheelchair often needs to be backed onto the lift from the curb (if the wheelchair is to face towards the front of the vehicle when loaded, as is typical).

SUMMARY OF THE INVENTION

Forming one aspect of the invention is a method comprising:

modifying a van, the van being of the type having a rear cargo area flanked by A, B, C and D pillars; and installing a wheelchair lift, the lift being of the type having an axis which is horizontal when the lift is operatively positioned and which has a platform that: has an axis; has a fully stowed position whereat the platform extends vertically upwardly from the axis when the lift is operatively positioned; is pivotably movable between the fully stowed position and a fully raised position whereat the platform extends horizontally from the axis when the lift is operatively positioned; and is, when the lift is operatively positioned, horizontally movable between the fully raised positioned and a fully lowered position that lies beneath the fully raised position, wherein the van modification includes: removing a portion of the passenger side of the vehicle between the C and D pillars to create a side opening; and mounting double leaf doors adjacent the side opening to create a side entrance; and wherein the wheelchair lift is installed such that: in the fully stowed position, the platform is disposed interiorly of the cargo area adjacent the side entrance; in the fully raised position, the platform is disposed exteriorly of the cargo area and communicates with a floor surface of the cargo area; and, in the fully lowered position, the platform is disposed exteriorly of the cargo area and communicates with the ground.

According to another aspect, the van can have double leaf rear doors between the D pillars and a sliding door which, when closed, lies between the B and C pillars on the passenger side.

According to another aspect, the modification can further comprise modifying the sliding door to avoid interference with the side doors.

According to another aspect, the van can be a 2022 Ford Transit 250.

According to another aspect, the lift can be a BraunAbility Model NCL 1000FIB3454HB-2 lift.

According to another aspect, the passenger side rear wheel arch can be modified to create the side opening.

Forming another aspect of the invention is an accessibility vehicle which comprises:

a van having: a rear cargo area having a floor and flanked by A, B, C and D pillars; and a side entrance on the passenger side of the vehicle between the C and D pillars; and a wheelchair lift having an axis and a platform.

The axis is horizontal and disposed at the base of the side entrance.

The platform:

has a fully stowed position whereat the platform extends vertically upwardly from the axis interiorly of the cargo area adjacent the side entrance;

is pivotably movable between the fully stowed position and a fully raised position whereat the platform extends horizontally, is disposed exteriorly of the cargo area and communicates with a floor surface of the cargo area; and is horizontally movable between the fully raised positioned and a fully lowered position that lies beneath the fully raised position, is disposed exteriorly of the cargo area and communicates with the ground.

According to another aspect, double leaf doors can provide for selective occlusion of the side entrance.

According to another aspect, the van can have a sliding door which, when closed, lies between the B and C pillars on the passenger side and double leaf rear doors between the D pillars.

According to other aspects, the lift can be a BraunAbility Model NCL 1000FIB3454HB-2 lift and the van can be a modified 2022 Ford Transit 250.

Advantages, features and characteristics of the invention will become evident upon review of the following detailed description with reference to the accompanying drawings, the latter being briefly described hereinafter.

DETAILED DESCRIPTION OF EXAMPLE EMBODIMENTS

Figure 1:
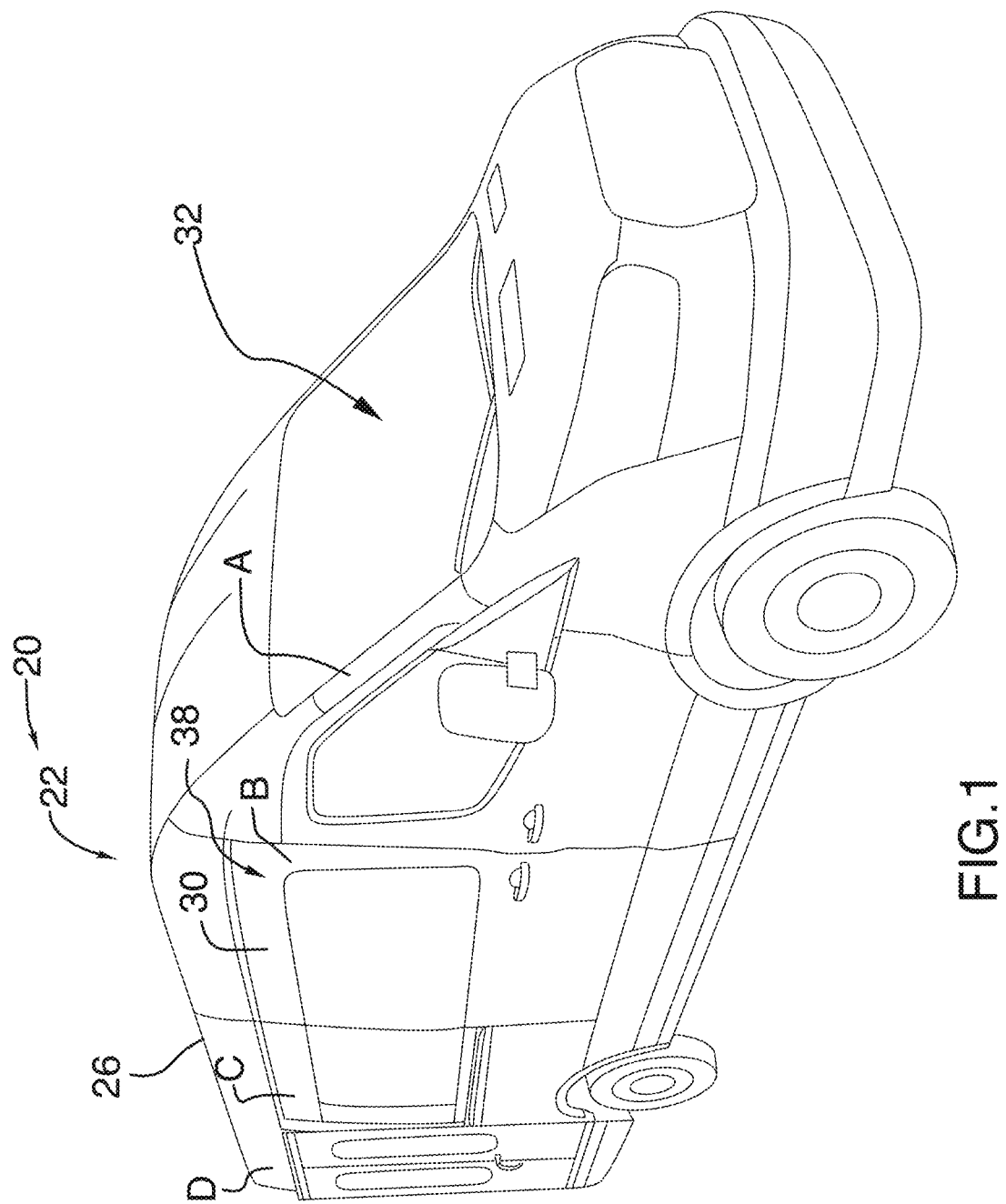
FIG. 1 is a profile view of an accessibility vehicle according to an example embodiment of the invention.
Figure 2:
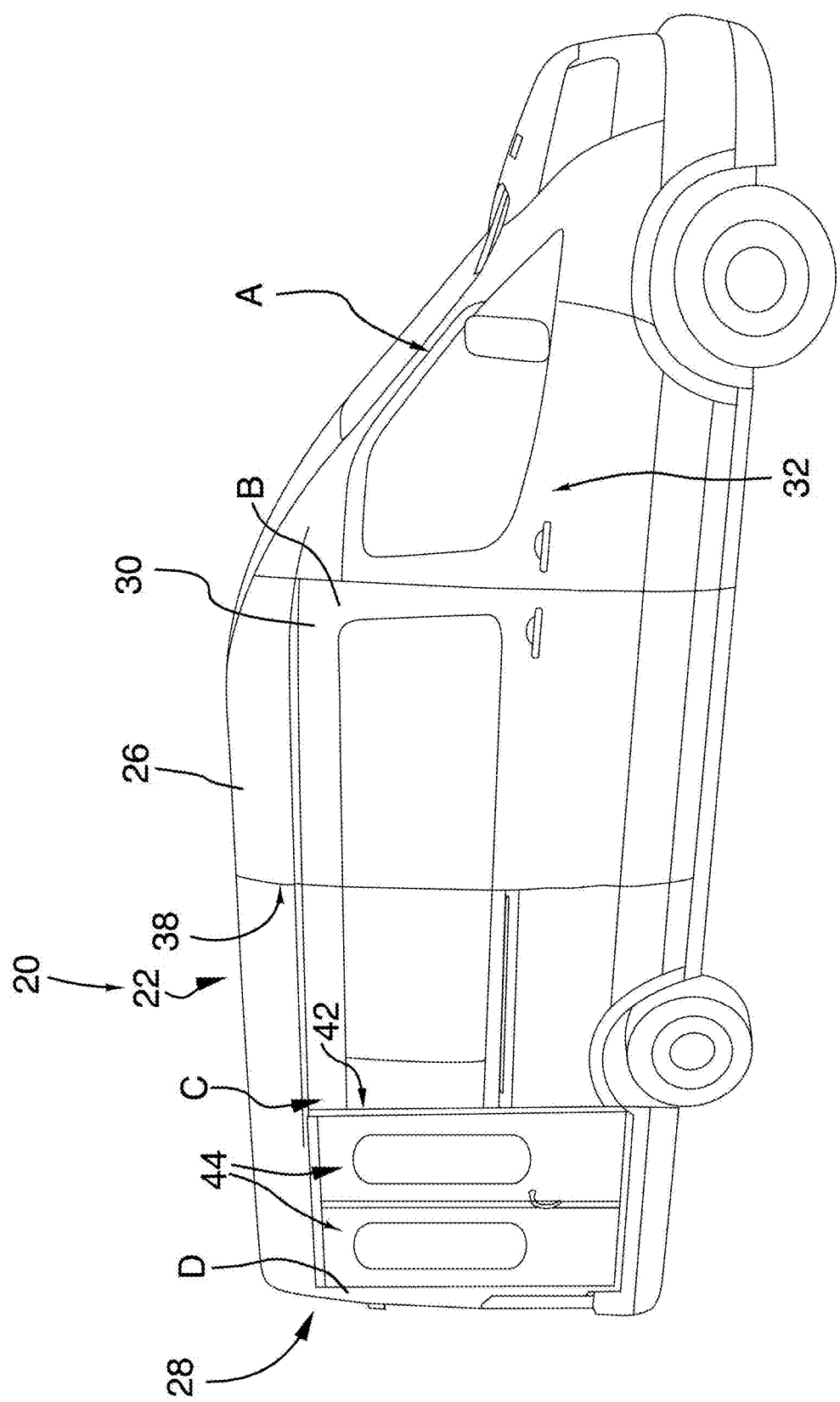
FIG. 2 is a side view of the vehicle of FIG. 1.
Figure 3:
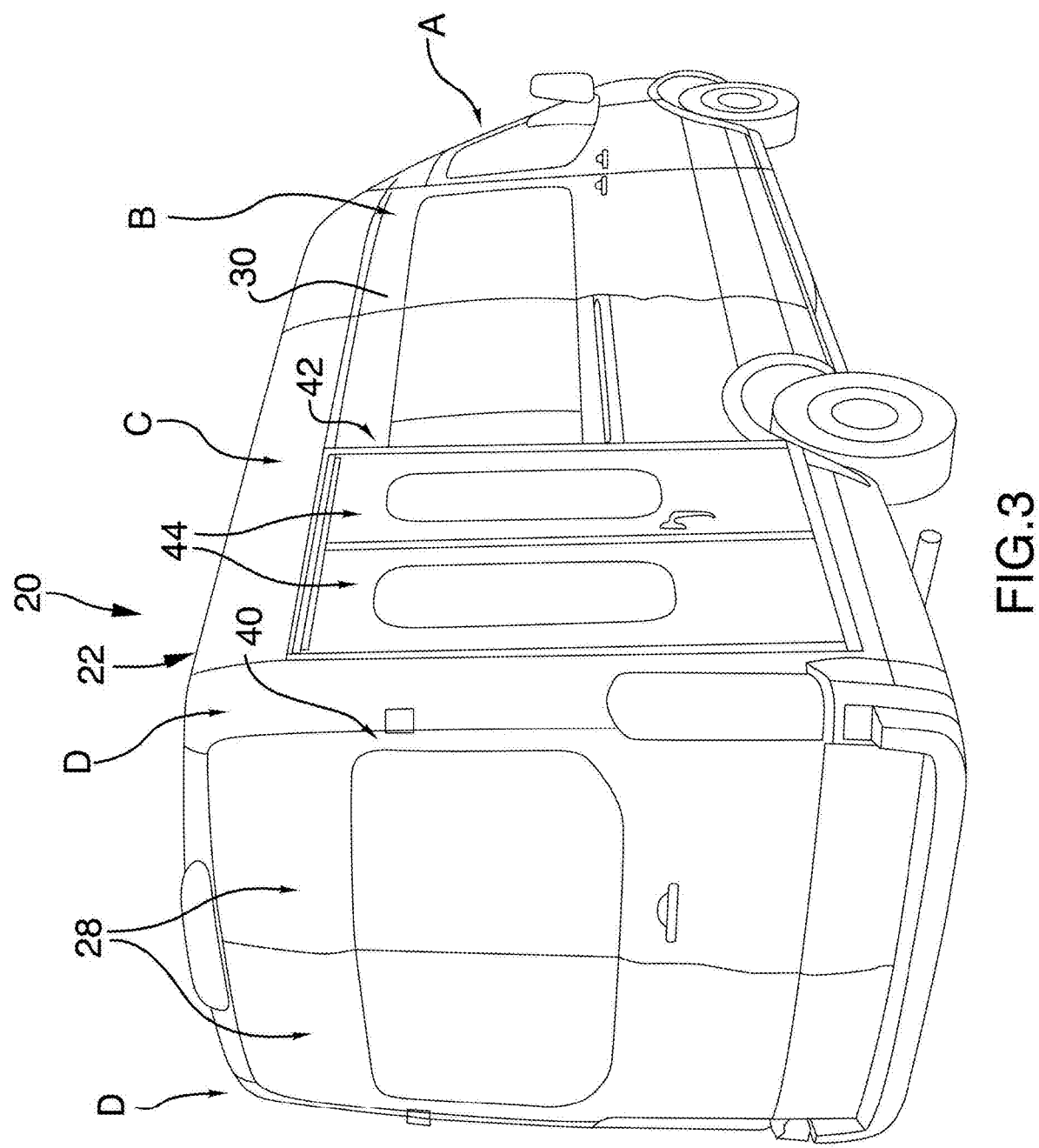
FIG. 3 is a rear view of the vehicle of FIG. 1.

An example embodiment of the invention in the form of an accessibility vehicle 20 is shown in FIG. 1 through FIG. 6 and will be understood to comprise a van 22 and a wheelchair lift 24.

Van

The van will be understood to be based upon a 2022 Ford Transit 250 of the general type having: a chassis 26; double leaf doors 28; a sliding door 30; and front row seating 32.

The chassis: defines an interior 34 area having a floor 36; includes A, B, C and D pillars flanking the interior area; defines an opening 38 between the B and C pillars on the passenger side and immediately adjacent the B pillar; and defines an opening 40 between the D pillars.

The double leaf doors selectively occlude the opening between the D pillars.

The sliding door selectively occludes the opening between the B and C pillars.

The front row seating permits a driver to pilot the vehicle.

Figure 7:
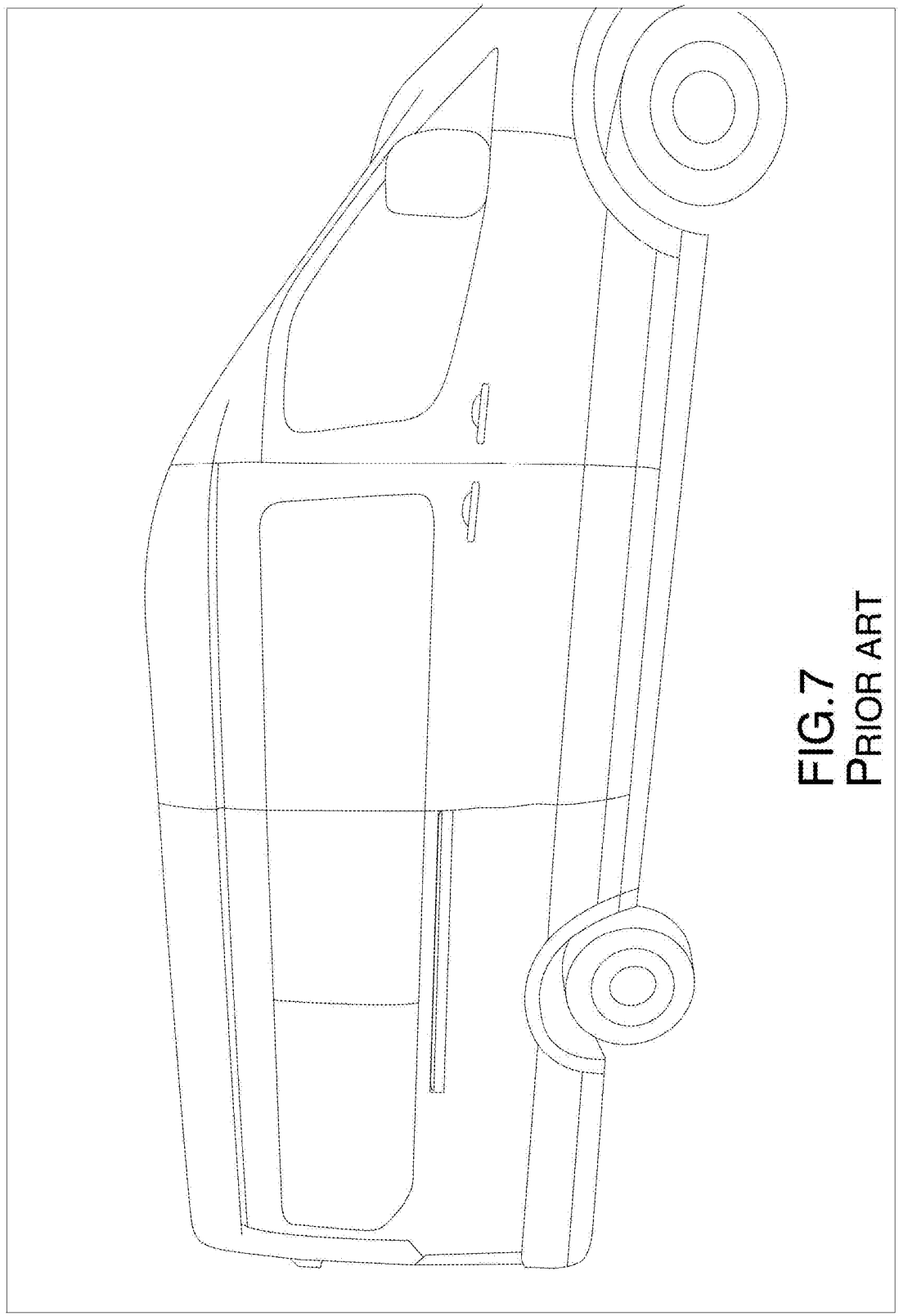
FIG. 7 is a view of a prior art van.
Figure 8:
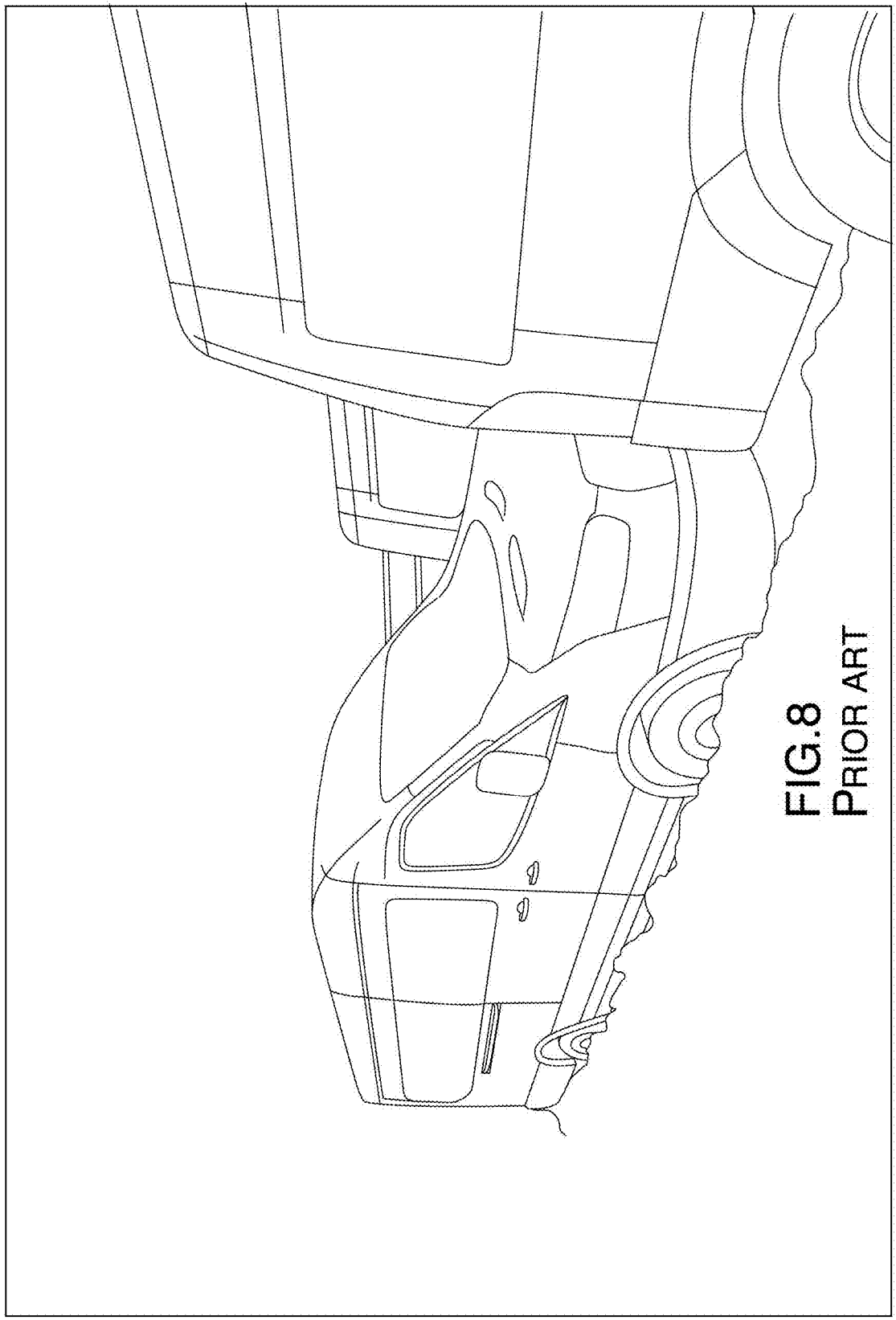
FIG. 8 is another view of a prior art van.

All of the above is conventional; a 2022 Ford Transit 250 is shown in FIG. 7 and FIG. 8 for reference.

However, the van of FIG. 1 to FIG. 6 will be seen to differ from the van of FIG. 7 and FIG. 8 in that, inter alia:

the chassis defines a side entrance 42 between the C and D pillars on the passenger side and immediately adjacent the D pillar;

double leaf doors 44 selectively occlude the side entrance; and tracks 46 are provided on the floor.

Wheelchair Lift

The wheelchair lift is a BraunAbility Model NCL 1000FIB3454HB-2 lift has an axis X-X and a platform 48.

The axis is horizontal and is disposed at the base of the side entrance.

Figure 4:
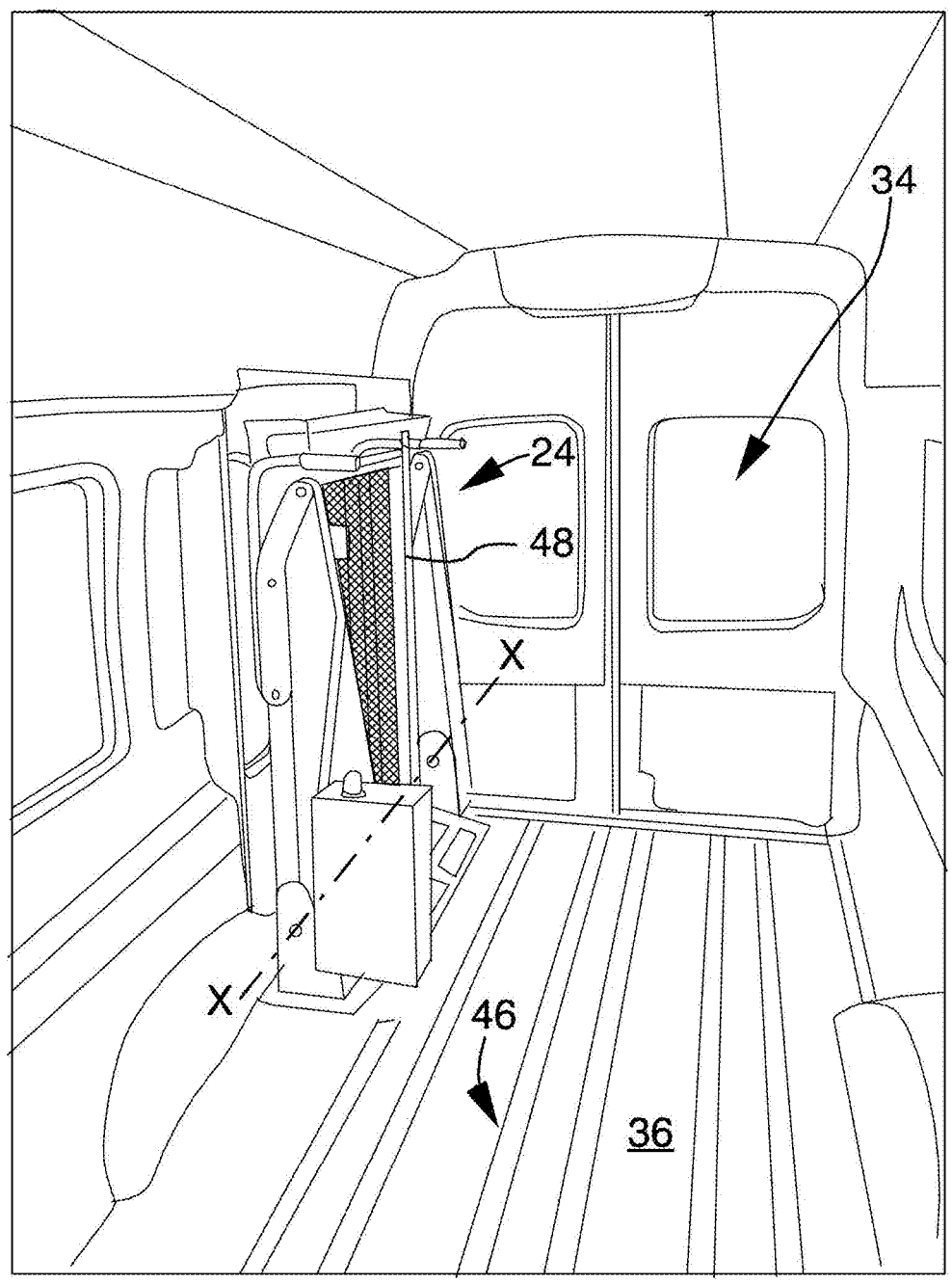
FIG. 4 is an interior view of the vehicle of FIG. 1.
Figure 5:
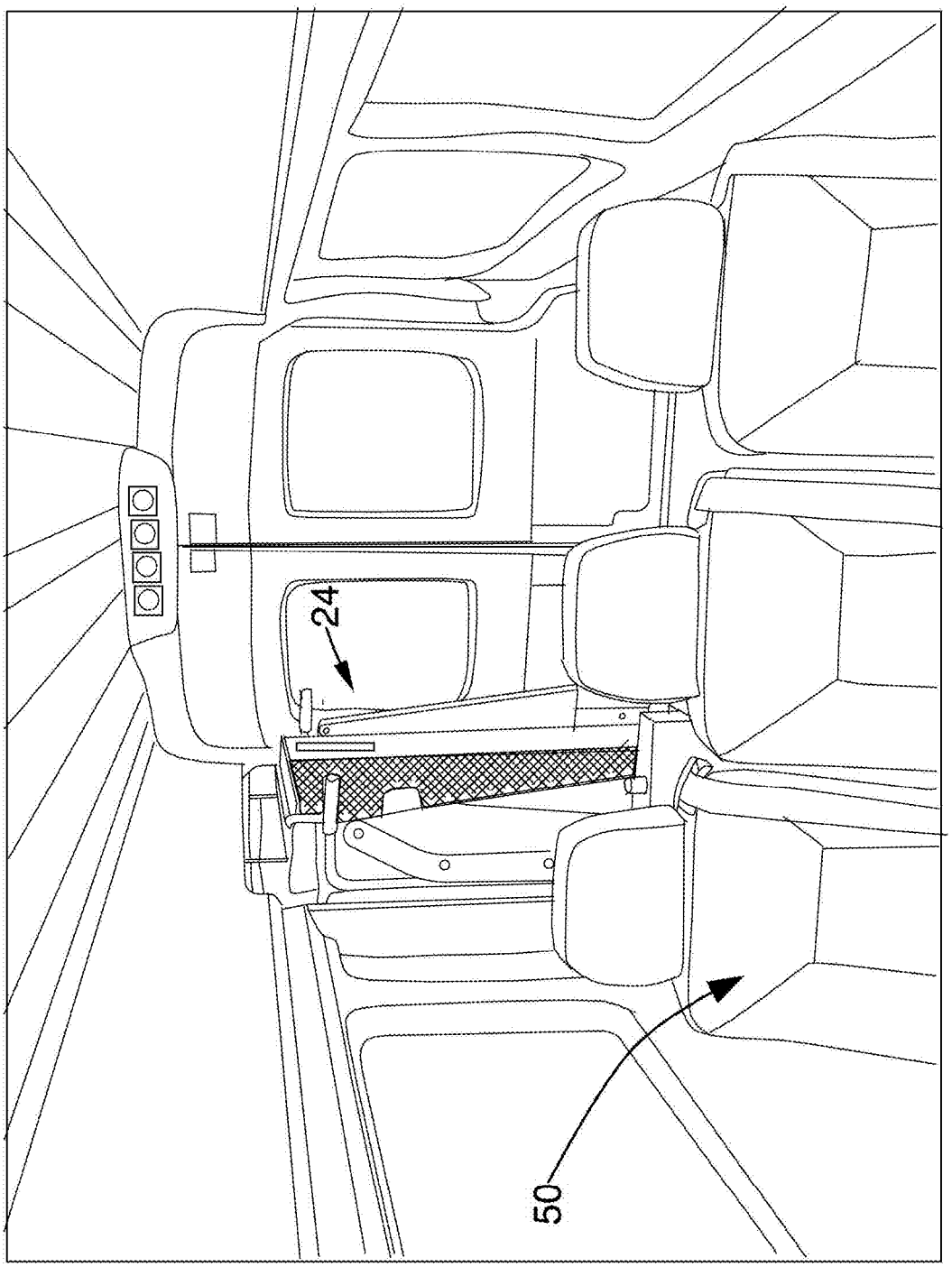
FIG. 5 is another interior view of the vehicle of FIG. 1.
Figure 6:
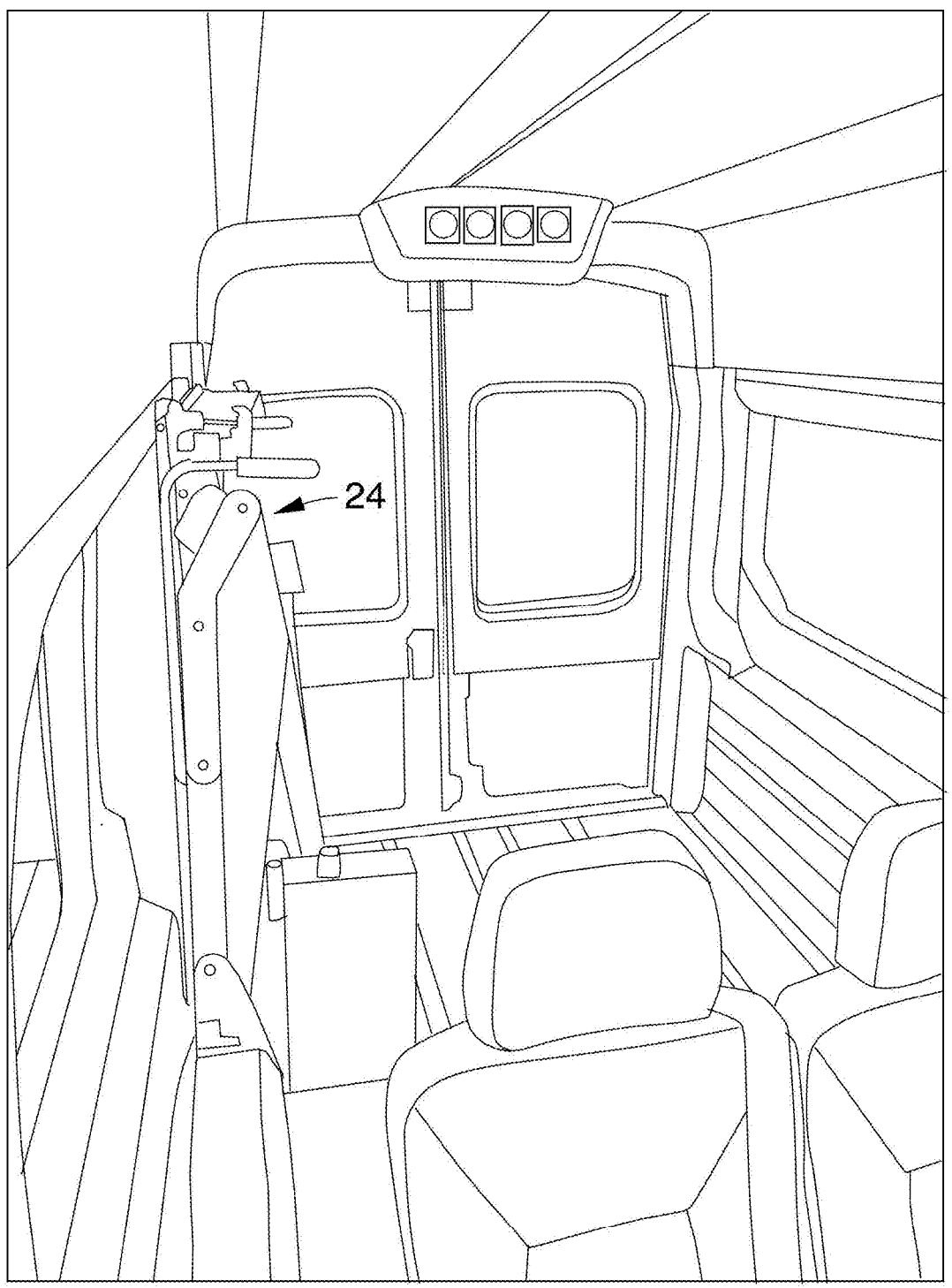
FIG. 6 is another interior view of the vehicle of FIG. 1.
Figure 12:
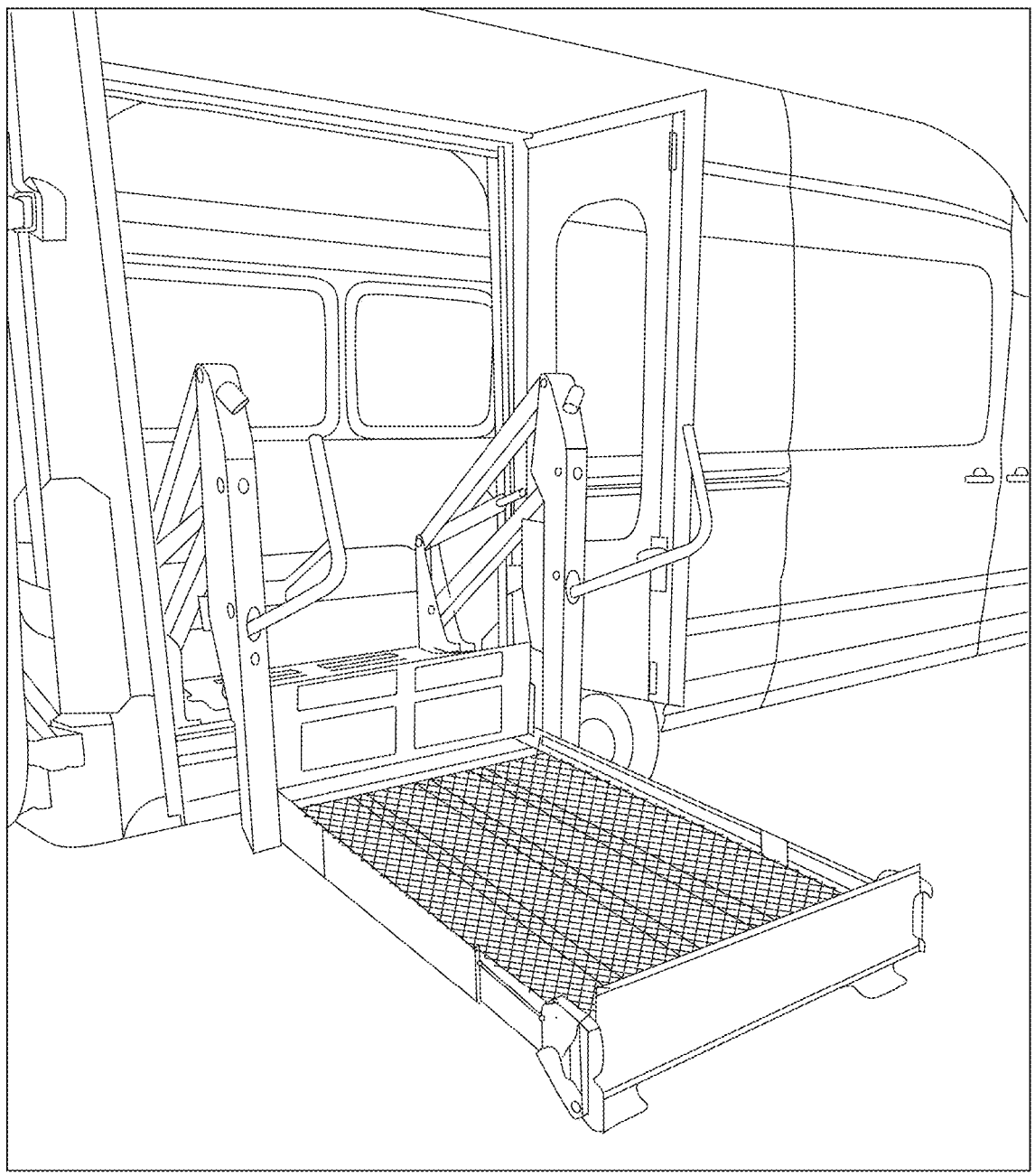
FIG. 12 is a view of the platform at the fully raised position.
Figure 13:
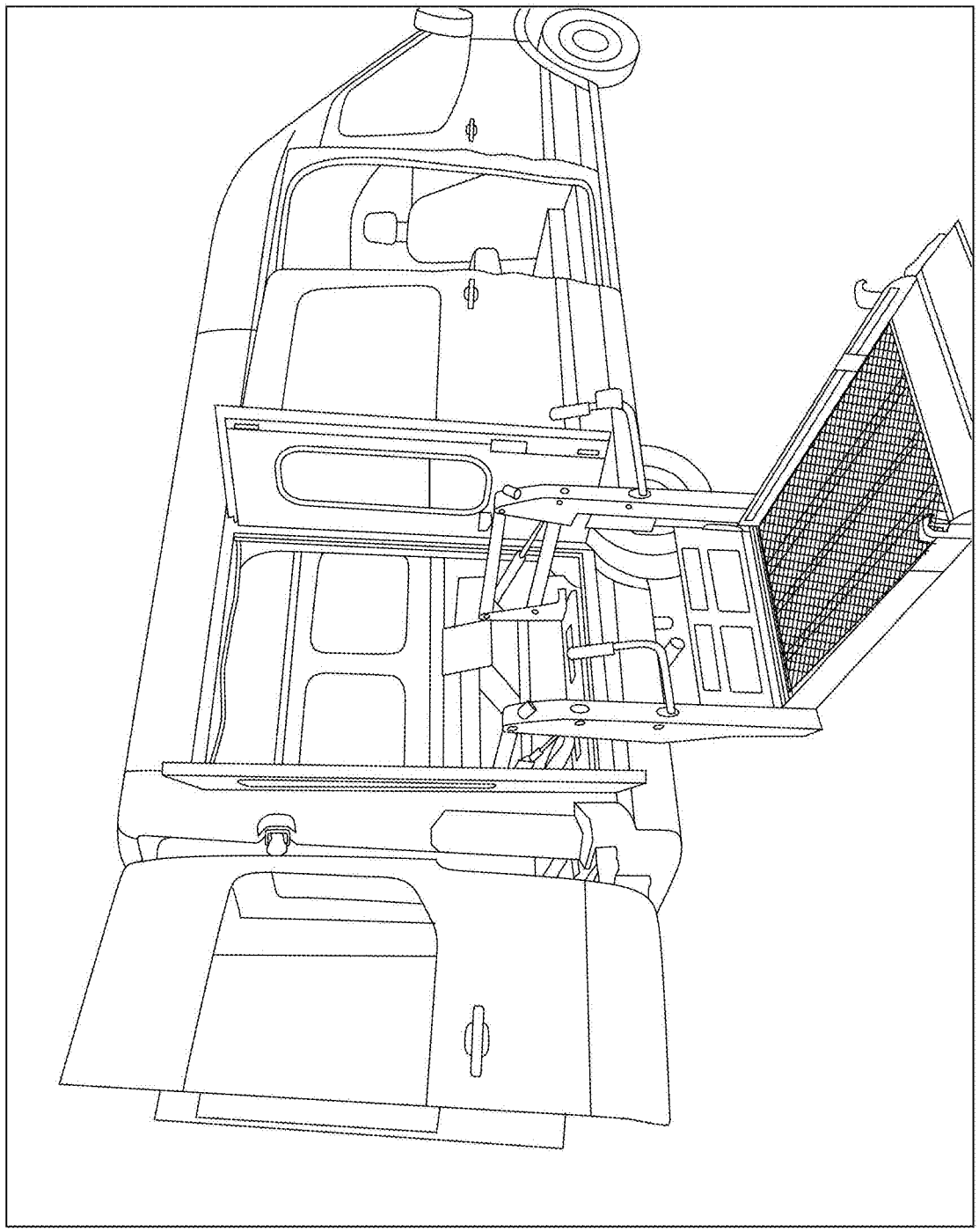
FIG. 13 is a view of the platform at the fully lowered position.

The platform:

has a fully stowed position whereat the platform extends vertically upwardly from the axis interiorly of the cargo area adjacent the side entrance, as indicated in FIGS. 4-6 is pivotably movable between the fully stowed position and a fully raised position shown in FIG. 12 whereat the platform extends horizontally, is disposed exteriorly of the cargo area and communicates with a floor surface of the cargo area; and is horizontally movable between the fully raised positioned and a fully lowered position shown in FIG. 13 that lies beneath the fully raised position, is disposed exteriorly of the cargo area and communicates with the ground.

Advantages

The accessibility vehicle will be appreciated to be of significant advantage. Without limitation in this regard:

Seating Variation the tracks allow for varied placement of seats, such as, for example, a second row of three seats as indicated by 50 in FIG. 5.

Figure 9:
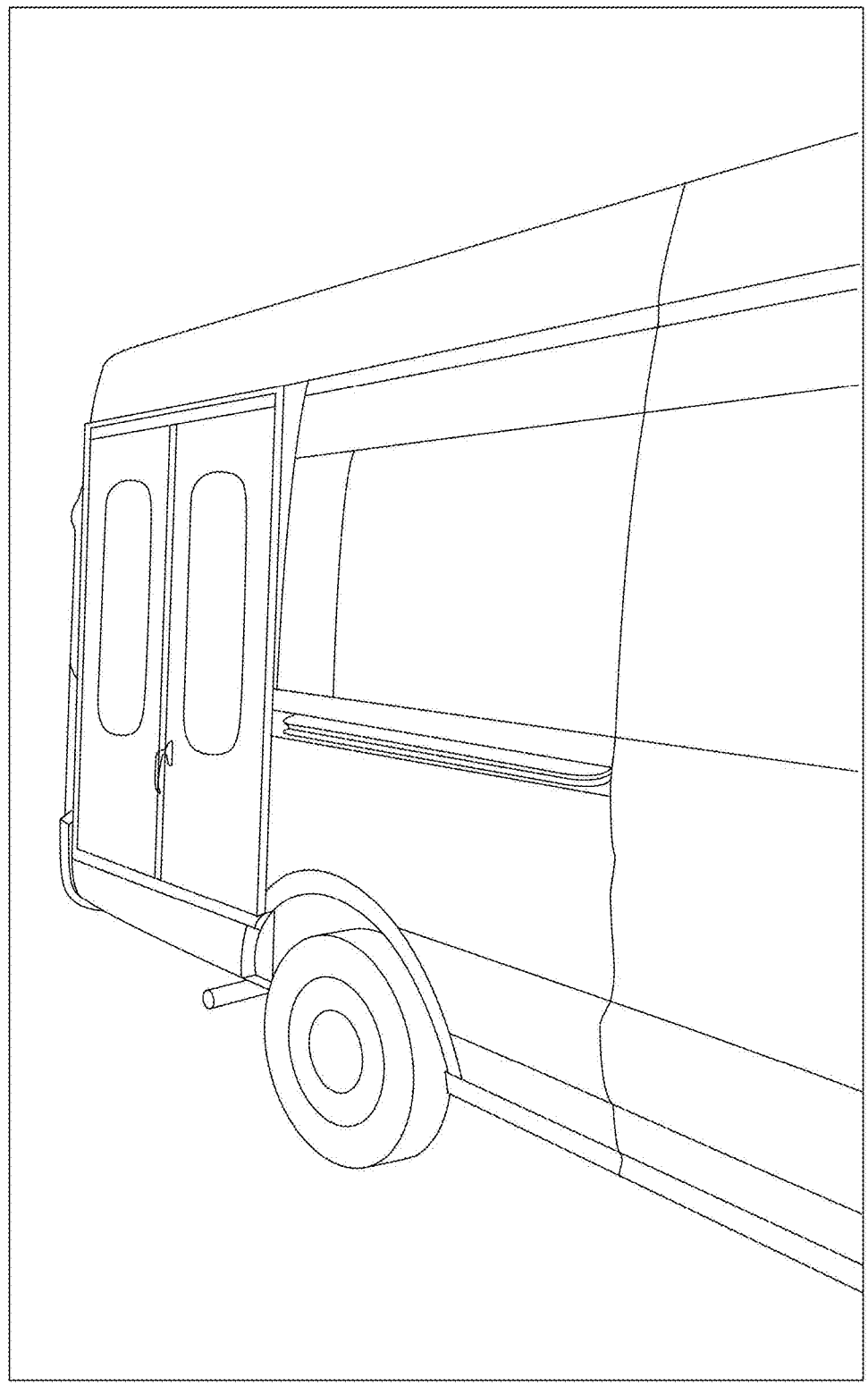
FIG. 9 is a rear view of the vehicle of FIG. 1 with the side entrance occluded.
Figure 10:
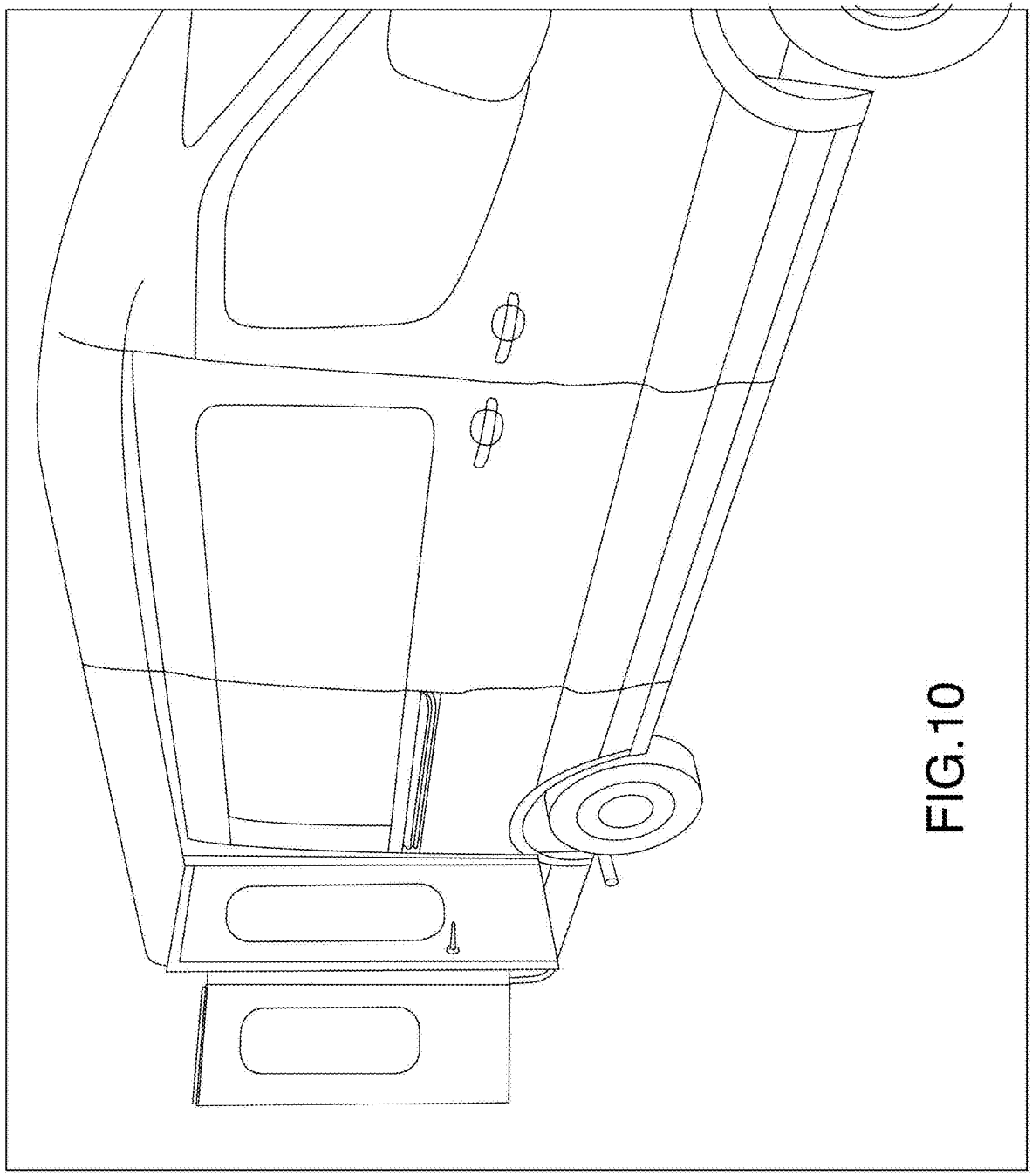
FIG. 10 is a view similar to FIG. 9 with the side entrance open and the platform in the fully stowed position.
Figure 11:
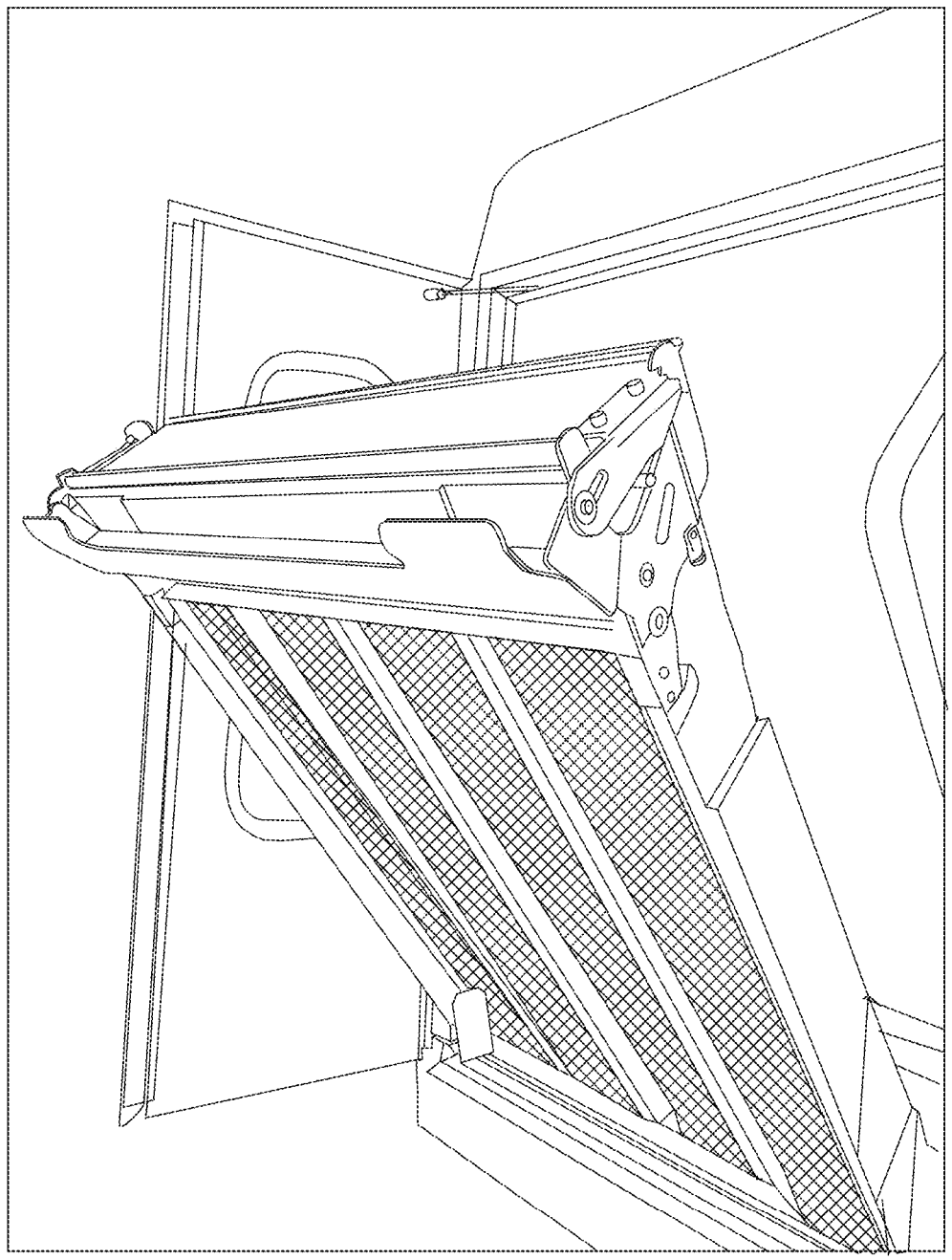
FIG. 11 is a view of the platform intermediate the fully stowed and the fully raised position.
Figure 14:
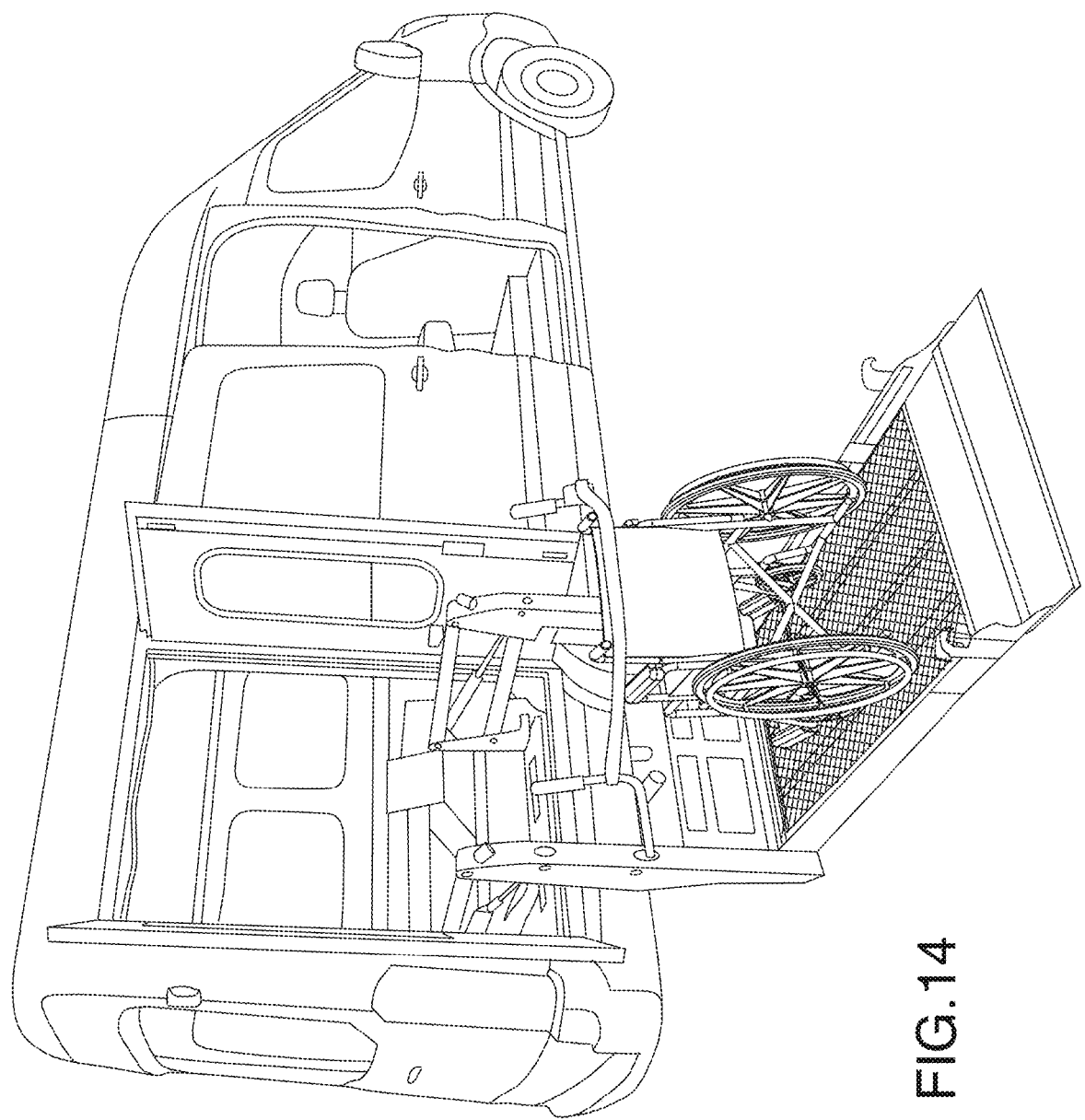
FIG. 14 is a view similar to FIG. 13 with a wheelchair loaded on the platform.
Figure 15:
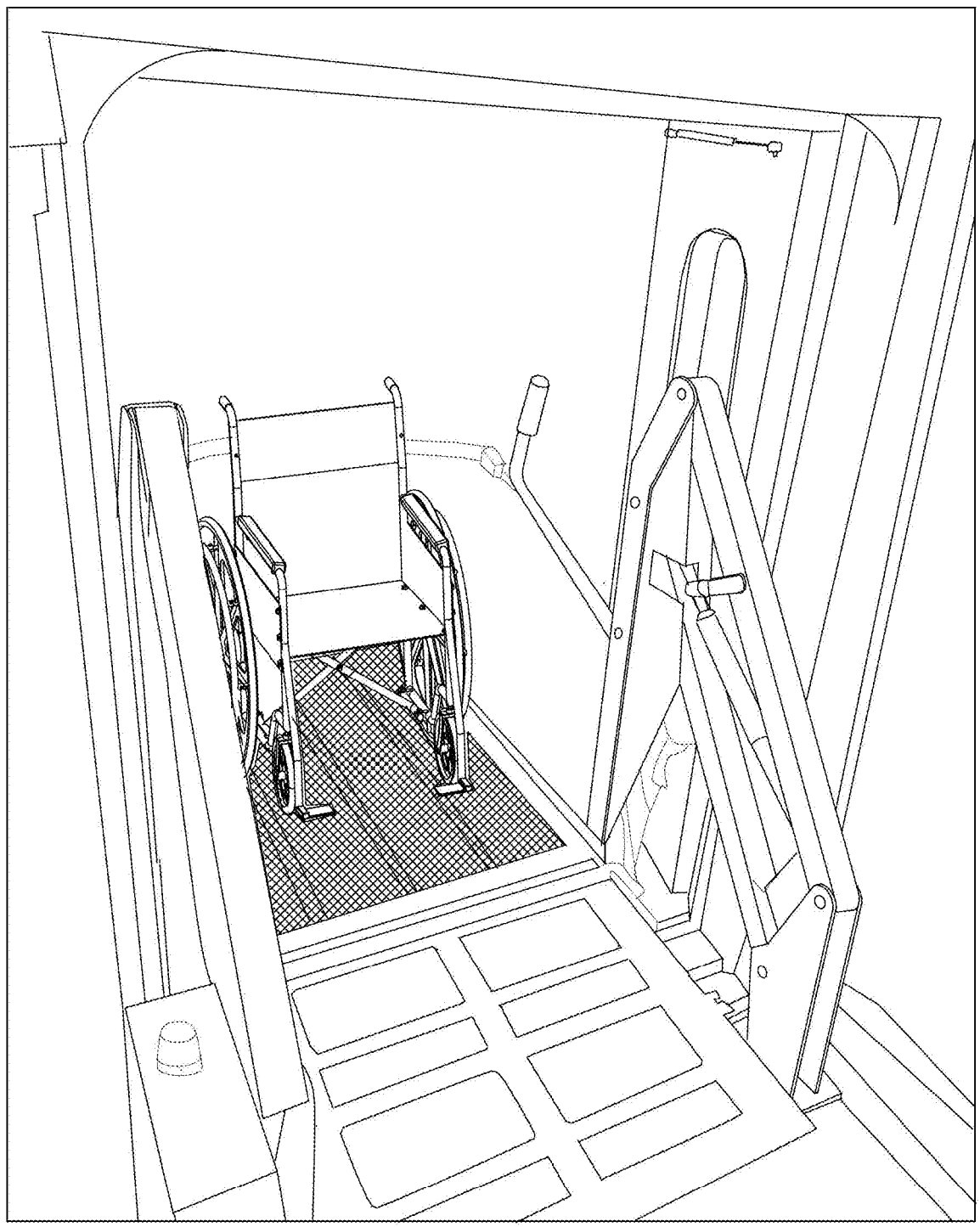
FIG. 15 is a view similar to FIG. 12 with a wheelchair loaded on the platform.
Figure 16:
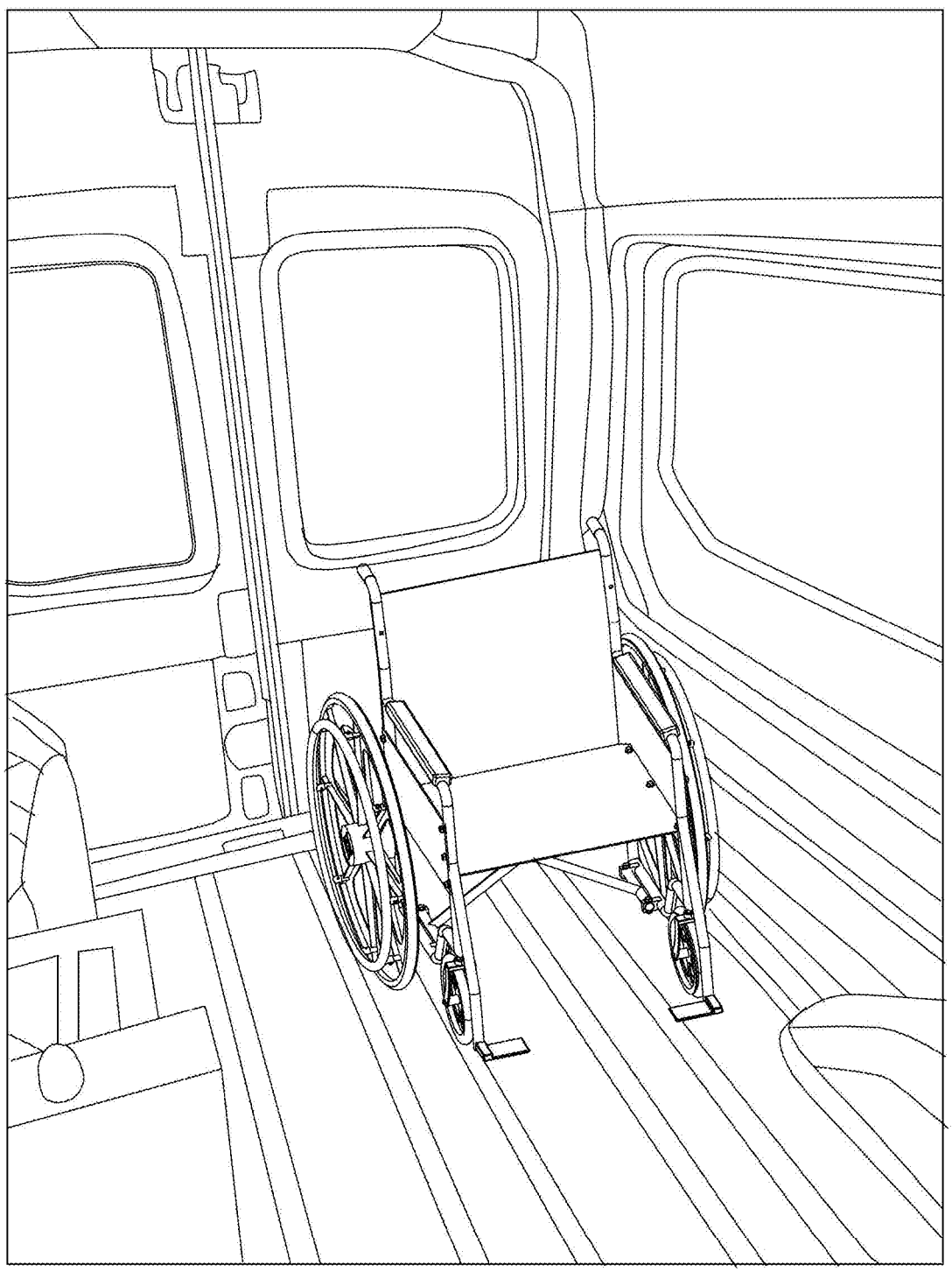
FIG. 16 is a view similar to FIG. 4 with a wheelchair on the floor.
Figure 17:
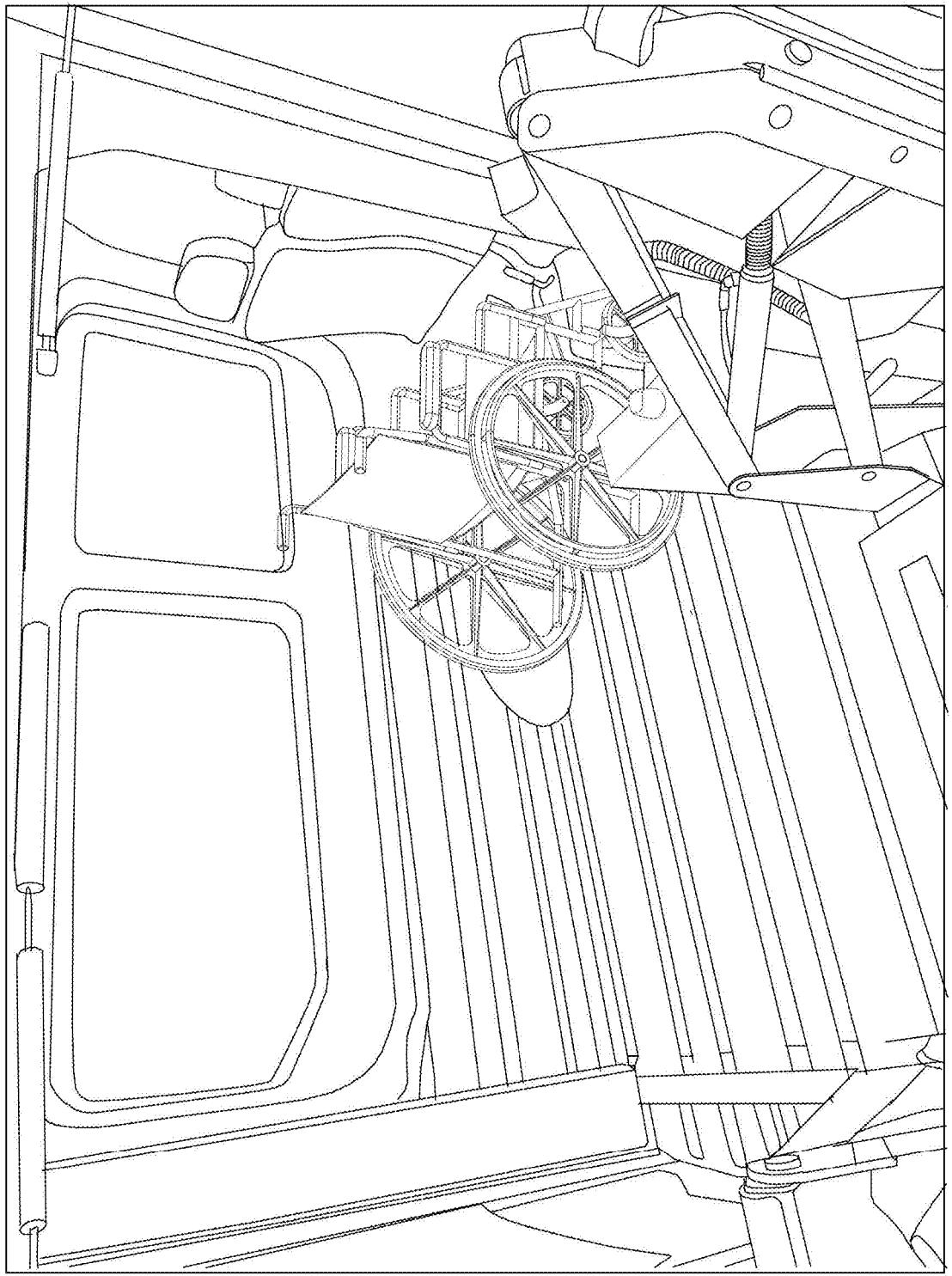
FIG. 17 is a view similar to FIG. 16 with a wheelchair positioned for transport.

Wheelchair Loading and Unloading a wheelchair can loaded into the vehicle by: opening the side leaf doors, as indicated by the sequence of FIG. 9 and FIG. 10; pivoting the ramp from the fully stowed position the to the fully raised position, as indicated by the sequence of FIG. 10 through FIG. 12; lowering the ramp to engage the ground as indicated by the sequence of FIG. 12 and FIG. 13; rolling a wheelchair onto the platform as indicated by the sequence of FIG. 13 and FIG. 14; raising the ramp to the fully raised position, as indicated by the sequence of FIGS. 14 and 15; and rolling the wheelchair onto the floor, as indicated by the sequence of FIG. 15 through FIG. 17.

Wheelchair Unloading a wheelchair can unloaded from the vehicle by: opening the side leaf doors; pivoting the ramp the to the fully raised position; rolling a wheelchair onto the platform; lowering the ramp to engage the ground; rolling a wheelchair onto the ground, as all indicated by the sequence of FIGS. 9, 10, 15, 14, 13.

In-Vehicle Chair Movement when the floor surface behind the first row seating is occupied by only a second row of seating, there exists sufficient floor space to permit a wheelchair to be rotated 360° from behind by an orderly, thereby to permit a chair to be wheeled frontwardly onto the ramp from the exterior and wheeled frontwardly onto the ramp from the interior, as evident upon a review of FIG. 16 and FIG. 17.

Ramp Stowage the platform can be stowed by: raising the ramp to the fully raised position, if necessary; pivoting the ramp to the fully stowed position; and occluding the side entrance with the leaf doors.

Moreover, all of the above advantage is obtained by combining:

a commercially available van that has an advantageous combination of value, durability and performance;

a commercially available wheelchair lift that has an advantageous combination of value, durability and performance; and a van modification that does not deleteriously impact upon reliability.

The van modification involves:

removing a portion of the passenger side of the vehicle between the C and D pillars and modifying the passenger side rear wheel arch to create the side opening mounting double leaf doors adjacent the side opening to create a side entrance [the door model 2022011395 from Lippert Components was found to be useful, once slightly reduced in height and permanently affixed]
modifying the sliding door [shortening the track] to avoid interference with the side doors; and
operatively installing the lift.

All of the foregoing is a matter of routine to persons of ordinary skill in the art and as such, further detail is neither required nor provided.

Whereas specific embodiments are described, variations are possible. Without limitation in this regard:
vans other than the Ford Transit 250 can be used;
wheelchair lifts other than the BraunAbility Model NCL 1000FIB345HB-2 can be used;
door systems other than Lipper 2022011395 can be used
track systems and track seating other than that shown can be used
the double leaf door occluding the side opening can be replaced with a single leaf door or a roller style door
a wheelchair ramp could be used in place of the lift.

Accordingly, the invention should be understood to be limited only by the accompanying claims, purposively construed.

The invention claimed is:

1. A method comprising:
modifying a van, the van being of the type having a rear cargo area flanked by A, B, C and D pillars; and
installing a wheelchair lift, the lift being of the type having an axis which is horizontal when the lift is operatively positioned and which has a platform that: has an axis; has a fully stowed position whereat the platform extends vertically upwardly from the axis when the lift is operatively positioned; is pivotably movable between the fully stowed position and a fully raised position whereat the platform extends horizontally from the axis when the lift is operatively positioned; and is, when the lift is operatively positioned, horizontally movable between the fully raised positioned and a fully lowered position that lies beneath the fully raised position;
wherein the van modification includes: removing a portion of the passenger side of the vehicle between the C and D pillars to create a side opening; and mounting double leaf doors adjacent the side opening to create a side entrance;
wherein the wheelchair lift is installed such that: in the fully stowed position, the platform is disposed interiorly of the cargo area adjacent the side entrance; in the fully raised position, the platform is disposed exteriorly of the cargo area and communicates with a floor surface of the cargo area; and, in the fully lowered position, the platform is disposed exteriorly of the cargo area and communicates with the ground; and
wherein the van has double leaf rear doors between the D pillars and a sliding door which, when closed, lies between the B and C pillars on the passenger side, and the modification further comprises modifying the sliding door to avoid interference with the side doors.

2. The method according to claim 1, wherein the van is a 2022 Ford Transit 250.

3. The method according to claim 1, wherein the lift is a BraunAbility Model NCL 1000FIB345HB-2 lift.

4. The method according to claim 1, wherein the passenger side rear wheel arch is modified to create the side opening.

5. An accessibility vehicle comprises:
a van having: a rear cargo area having a floor and flanked by A, B, C and D pillars; a sliding door which, when closed, lies between the B and C pillars on a passenger side and double leaf rear doors between the D pillars; and a side entrance on the passenger side of the vehicle between the C and D pillars; and
a wheelchair lift having an axis and a platform, the axis being horizontal and disposed at the base of the side entrance, the platform:
having a fully stowed position whereat the platform extends vertically upwardly from the axis interiorly of the cargo area adjacent the side entrance;
being pivotably movable between the fully stowed position and a fully raised position whereat the platform extends horizontally, is disposed exteriorly of the cargo area and communicates with a floor surface of the cargo area; and
being horizontally movable between the fully raised positioned and a fully lowered position that lies beneath the fully raised position, is disposed exteriorly of the cargo area and communicates with the ground.

6. The vehicle according to claim 5, wherein double leaf doors provide for selective occlusion of the side entrance.

7. The vehicle according to claim 5, wherein the van is a modified 2022 Ford Transit 250.

8. The vehicle according to claim 5, wherein the lift is a BraunAbility Model NCL 1000FIB345HB-2 lift.

9. An accessibility vehicle comprises:
a van having:
a rear cargo area having a floor and flanked by A, B, C and D pillars;
a side entrance on the passenger side of the vehicle between the C and D pillars; and
a sliding door which, when closed, lies between the B and C pillars on the passenger side; and
a wheelchair lift having an axis and a platform, the axis being horizontal and disposed at the base of the side entrance, the platform:
having a fully stowed position whereat the platform extends vertically upwardly from the axis interiorly of the cargo area adjacent the side entrance;
being pivotably movable between the fully stowed position and a fully raised position whereat the platform extends horizontally, is disposed exteriorly of the cargo area and communicates with a floor surface of the cargo area; and
being horizontally movable between the fully raised positioned and a fully lowered position that lies beneath the fully raised position, is disposed exteriorly of the cargo area and communicates with the ground.

10. The vehicle according to claim 9, wherein double leaf doors provide for selective occlusion of the side entrance.

11. The vehicle according to claim 10, wherein a portion of the double leaf doors extends into a passenger side rear wheel arch.

12. The vehicle according to claim 9, further including double leaf rear doors between the D pillars.

13. A method comprising:
modifying a van, the van being of the type having a rear cargo area flanked by A, B, C and D pillars; and
installing a wheelchair lift, the lift being of the type having an axis which is horizontal when the lift is operatively positioned and which has a platform that: has an axis; has a fully stowed position whereat the platform extends vertically upwardly from the axis when the lift is operatively positioned; is pivotably movable between the fully stowed position and a fully raised position whereat the platform extends horizontally from the axis when the lift is operatively positioned; and is, when the lift is operatively positioned, horizontally movable between the fully raised positioned and a fully lowered position that lies beneath the fully raised position;

wherein the van modification includes: removing a portion of the passenger side of the vehicle between the C and D pillars to create a side opening and modifying a passenger side rear wheel arch to create the side opening; and mounting double leaf doors adjacent the side opening to create a side entrance; and wherein the wheelchair lift is installed such that: in the fully stowed position, the platform is disposed interiorly of the cargo area adjacent the side entrance; in the fully raised position, the platform is disposed exteriorly of the cargo area and communicates with a floor surface of the cargo area; and, in the fully lowered position, the platform is disposed exteriorly of the cargo area and communicates with the ground.

14. The method according to claim 13, wherein the double leaf doors provide for selective occlusion of the side entrance.

15. The method according to claim 13, wherein a portion of the double leaf doors extends into a passenger side rear wheel arch.

16. The method according to claim 13, further including double leaf rear doors between the D pillars.

* * * * *